United States Patent
Beswick et al.

(10) Patent No.: US 6,837,946 B2
(45) Date of Patent: Jan. 4, 2005

(54) METHOD FOR THE PRODUCTION OF A PART OF A ROLLING BEARING

(75) Inventors: John Michael Beswick, Montfoort (NL); Michel Christian Gorenne, Tours (FR); Antonin Ballay, Saint-Cyr sur Loire (FR)

(73) Assignee: SKF Engineering and Research Centre B.V., Nieuwegein (NL)

( * ) Notice: Subject to any disclaimer, the term of this patent is extended or adjusted under 35 U.S.C. 154(b) by 74 days.

(21) Appl. No.: 10/240,167

(22) PCT Filed: Apr. 12, 2001

(86) PCT No.: PCT/NL01/00294
§ 371 (c)(1),
(2), (4) Date: Sep. 30, 2002

(87) PCT Pub. No.: WO01/79568
PCT Pub. Date: Oct. 25, 2001

(65) Prior Publication Data
US 2004/0105777 A1 Jun. 3, 2004

(51) Int. Cl.$^7$ ............................ C22C 38/22; C21D 9/40; C21D 8/00
(52) U.S. Cl. ...................... 148/334; 148/906; 148/589; 384/625; 384/912
(58) Field of Search ................................ 148/589, 334, 148/906; 384/625, 912

(56) References Cited

U.S. PATENT DOCUMENTS

| 4,642,219 A | | 2/1987 | Takata et al. |
| RE34,278 E | | 6/1993 | Beswick |
| 5,261,975 A | * | 11/1993 | Sorstrom et al. ............ 148/334 |
| 6,051,082 A | * | 4/2000 | Okita et al. .................. 148/333 |
| 6,517,644 B2 | * | 2/2003 | Kiuchi et al. ................ 148/333 |

FOREIGN PATENT DOCUMENTS

| DE | 198 21 797 C1 | 7/1999 |
| EP | 0 721 996 A1 | 7/1996 |
| FR | 2 636 076 A1 | 3/1990 |
| FR | 2 645 544 A1 | 10/1990 |
| JP | 06 010097 A | 1/1994 |
| WO | WO 99/66092 | 12/1999 |

* cited by examiner

*Primary Examiner*—Deborah Yee
(74) *Attorney, Agent, or Firm*—Oliff & Berridge, PLC

(57) ABSTRACT

Method for the production of a part of a rolling bearing, such as a ring for a ball bearing. The starting material used is a grade of steel containing 0.90 1.00% C; at most 0.15% Si; 0.25–0.45% Mn; at most 0.0015% P; at most 0.010% S; 1.30–1.50% Cr; at most 0.15% Ni; 0.20–0.23% Mo; at most 0.20–0.23% Cu; at most 20 ppm Ti; at most 8 ppm O. Before subjecting this grade of steel to a quenching and tempering treatment, the shaped item is subjected to plastic deformation in the hot or cold state. The mechanical properties and in particular the anticipated life under severe stress improve as a result.

10 Claims, 1 Drawing Sheet

METHOD FOR THE PRODUCTION OF A PART OF A ROLLING BEARING

Figure 1:
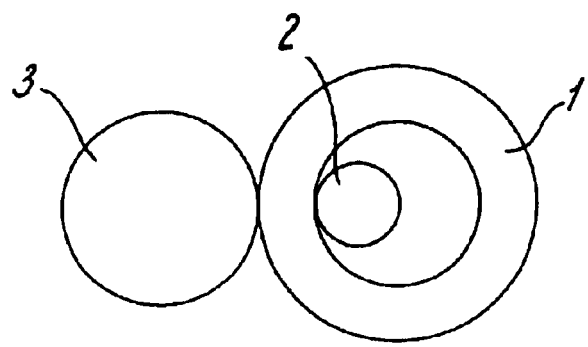

The present invention relates to a method for the production of a part of a rolling bearing, comprising the provision of a grade of steel containing, in % (by wt.), 0.90–1.00 C;
at most 0.15 Si;
0.25–0.45 Mn;
at most 0.015 P;
at most 0.010 S;
1.30–1.50 Cr;
at most 0.15 Ni;
0.20–0.23 Mo;
at most 0.20 Cu;
at most 20 Ti (ppm);
at most 8 O (ppm), wherein a shaped item is produced from this steel, starting from a ferritic structure thereof, and is subjected to a heat treatment in order to increase the hardness at the surface of the item, possibly followed by a machining after-treatment.

A method of this type is disclosed in U.S. 34278Re. This publication describes the applicant's so-called 3M steel. It was found that by modifying grades of steel containing 1% C and 1.5% Cr for conventional ball bearings appreciably improved characteristics can be obtained.

Rolling bearings in which 3M steel is used are employed in gearboxes, lathes and the like which are subject to severe stress.

The aim of the present invention if to prolong the life under severe stress, the rolling bearing partly determining the life of the component concerned. Examples of such components are alternating current generators in cars. As a result of the increasing use of electricity in cars, such generators are becoming increasingly heavy and the tensile force applied to the belt by means of which such generators are driven from the crankshaft of an internal combustion engine is becoming higher all the time. A further aim is to be able to modify the geometry of bearings in applications where this is not essential for the bearing life in such a way that it is possible for lighter weight constructions to suffice.

This aim is realised with a method as described above in that the shaped item is plastically deformed before the heat treatment. According to the invention, for example, a ring of a rolling bearing, such as a deep-groove ball bearing, is produced by some method or other from a grade of steel as described above. This is then subjected to further plastic deformation.

Surprisingly, it has been found that after quenching and tempering the characteristics of such a grade of steel are appreciably improved, in particular close to the surface. The life of bearings produced using a steel obtained in such a way is appreciably prolonged compared with the life of 3M steel treated in the conventional way, that is to say where no plastic deformation has taken place. Compared with the grades of ball bearing steel customary in the state of the art, such as 52100, the life is further prolonged.

An attempt will be made below to provide an explanation for these improved mechanical properties, but it must be understood that this explanation in no way restricts the patent. On the contrary, the scope of protection of the patent is determined by the appended claims.

The inventors have found that as a result of plastic deformation before a heat treatment, such as hardening, on the one hand the grain structure in the end product is refined and, on the other hand, the surface hardness thereof increases.

Moreover, it has surprisingly been found that a 3M grade of steel can be plastically deformed appreciably better than conventional 1 C, 1.5 Cr grades of ball bearing steel. Up to now there has never been any attempt to determine the deformability of 3M steel, but it has been found that deformation of 30–70% is possible. The above percentage is expressed as the reduction in the cross-sectional surface area of an article produced from the steel according to the invention. Preferably, deformation of between 50 and 60% is employed.

Such deformation can not be achieved with conventional grades of ball bearing steel. In such grades of steel irrevocable cracking would occur during deformation, as a result of which the strength of the end product only decreases. It has been found that as a result of such an appreciable plastic deformation the mechanical properties improve, resulting in an appreciably prolonged life compared with products made from 3M steel that have not been subjected to plastic deformation.

The plastic deformation described above can be carried out either at elevated temperature or at room temperature. If this deformation is carried out at elevated temperature it is essential that the $Ac_1$ temperature is not exceeded. The 3M steel described here is so-called full-hardening steel, in contrast to grades of steel where a subsequent carburisation is carried out.

As described above, it is possible to produce rings for rolling bearings by the method now proposed. Starting from a relatively small ring, the ring can be brought to the desired final size by rolling. This rolling treatment constitutes the plastic deformation.

The invention can be employed in particular for bearings of alternating current generators for internal combustion engines. These are subjected to vibration and high stress. It has been found that the life can be appreciably prolonged, so that, as far as the bearings are concerned, the generator concerned has a life at least as long as that of the other parts of the internal combustion engine.

It has been found that the steel according to the present invention has a fine structure, that is to say consists of fine ferrite in which relatively little cementite and a relatively large amount of $M_{23}C_6$ are present.

Figure 2:
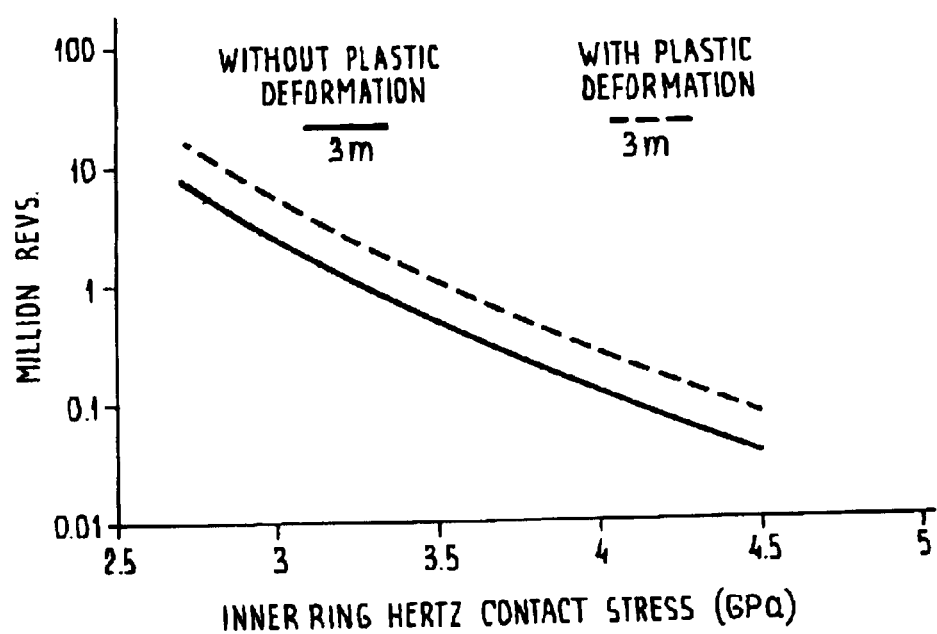

The invention will be explained in more detail below with reference to an embodiment shown highly diagrammatically in the drawing. In the drawing:

FIG. 1 shows, highly diagrammatically, the production of a part of a rolling bearing according to the invention; and FIG. 2 shows the extended life of a part of a rolling bearing according to the invention compared with a 3M steel that has not been subjected to plastic deformation.

FIG. 1 shows, highly diagrammatically, the production of a ring for a rolling bearing. This ring is indicated by 1. It is made of a grade of steel containing, in % (m/m), 0.90–1.00 C;
at most 0.15 Si;
0.25–0.45 Mn;
at most 0.015 P;
at most 0.010 S;
1.30–1.50 Cr;
at most 0.15 Ni;
0.20–0.23 Mo;
at most 0.20 Cu;
at most 20 Ti (ppm);
at most 8 O (ppm).

This ring of relatively small dimensions is placed between rollers 2 and 3 and at elevated temperature, starting from a ferritic matrix (optionally annealed before spherodisation), the ring is subjected to appreciable plastic deformation. In the illustrative embodiment shown, deformation of approximately 55% takes place, measured as the reduction in the cross-sectional surface area of the ring 1.

Ring 1 is processed essentially to its final size by means of this plastic deformation. In contrast to the state of the art, no machining treatment is carried out. Quenching at approximately 860° C. and tempering at approximately 160° C. for 1.5 hours then take place. The hardness of the ring thus obtained was approximately 825 HV and the grain size was on average 6 μm. The matrix consisted of ferrite and cementite with $M_{23}C_6$ carbides present therein.

The rings produced in this way were combined to produce a rolling bearing and more particularly a deep-groove ball bearing. A comparison test was then carried out between a rolling bearing produced from components made of 3M steel not subjected to plastic deformation and a rolling bearing produced from components made of 3M steel according to the invention. The results of this test are shown in FIG. 2.

It can be seen from this figure that the inner ring contact stress is appreciably lower in the case of the 3M steel according to the invention.

It has been found that the composition of the steel described above is critical. Changing the composition lowers the plastic deformability and thus the improved final mechanical properties of the component concerned. For instance, it is possible for either more coarse carbides to be produced or more cavities to be produced during the plastic deformation, and the like, which have an adverse effect on the final mechanical properties.

Moreover, the energy required for deformation can increase appreciably if the composition is changed.

Although the invention has been described with reference to a preferred embodiment, it must be understood that numerous modifications can be made thereto without going beyond the scope of the appended claims.

What is claimed is:

1. Method for the production of a part of a rolling bearing, comprising the provision of a grade of steel containing, in % (by wt.), 0.90–1.00 C;
   at most 0.15 Si;
   0.25–0.45 Mn;
   at most 0.015 P;
   at most 0.010 S;
   1.30–1.50 Cr;
   at most 0.15 Ni;
   0.20–0.23 Mo;
   at most 0.20 Cu;
   at most 20 Ti (ppm);
   at most 8 O (ppm), wherein a shaped item is produced from this steel, starting from a ferritic structure thereof, and is subjected to a heat treatment in order to increase the hardness at the surface of the item, followed by a machining after-treatment, if appropriate, the shaped item being plastically deformed before the heat treatment.

2. Method according to claim 1, wherein said plastic deformation comprises reduction in cross-section of 30–70% of the original cross-sectional surface area of said shaped item.

3. Method according to claim 2, wherein said plastic deformation comprises reduction in cross-section of 50–60%.

4. Method according to claim 1, wherein said plastic deformation is carried out elevated temperature.

5. Method according to claim 4, wherein said temperature is at most 720° C.

6. Method according to claim 1, wherein said plastic deformation is carried out at room temperature.

7. Method according to claim 1, wherein said part is a ring that, starting from a smaller ring, is brought to the desired diameter by rolling.

8. Method according to claim 7, wherein said part is a bearing ring of a ball bearing.

9. Part of a rolling bearing produced from a grade of a steel containing, in % (m/m), at most 0.015 P;
   at most 0.010 S;
   1.30–1.50 Cr;
   at most 0.15 Ni;
   0.20–0.23 Mo;
   at most 0.20 Cu;
   at most 20 Ti (ppm);
   at most 8 O (ppm), wherein said steel contains $M_{23}C_6$ carbides and has a grain size of between 5 and 8 μm.

10. Part according to claim 9, having a hardness of 800–850 HV.

* * * * *